May 11, 1943.　　　C. H. DANIELS　　　2,318,926
FLEXIBLE INSOLE AND TREATMENT THEREOF
Filed Nov. 4, 1940
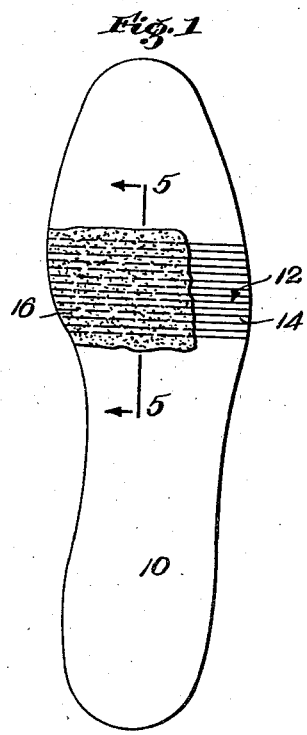
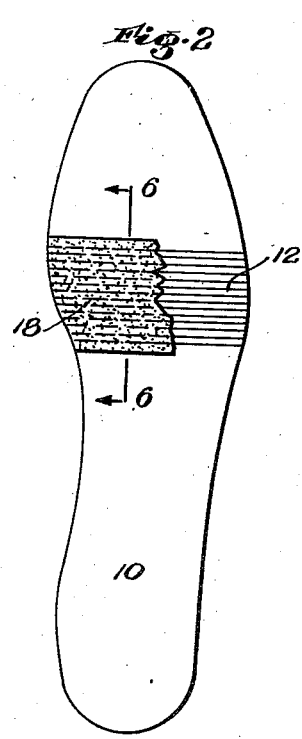
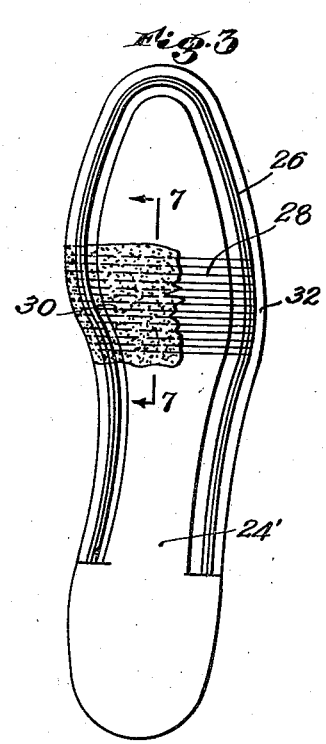
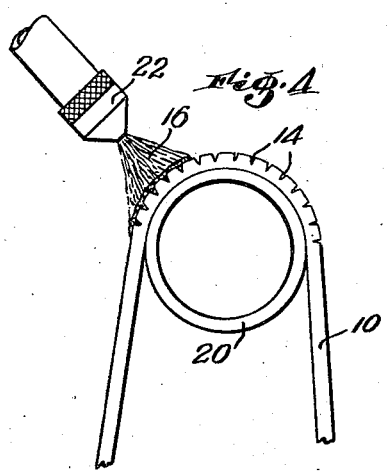
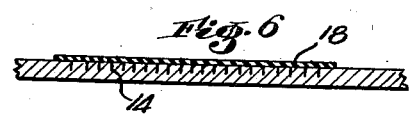
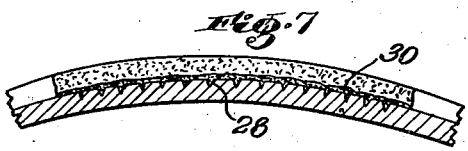
Inventor
Claude H. Daniels,
by Thomson & Thomson
his Attys.

Patented May 11, 1943

2,318,926

UNITED STATES PATENT OFFICE 2,318,926

FLEXIBLE INSOLE AND TREATMENT THEREOF

Claude H. Daniels, Greenwich, Conn.

Application November 4, 1940, Serial No. 364,229

4 Claims. (Cl. 12—146)

This invention relates to improvements in flexible insoles and improvements in methods of making flexible insoles for boots and shoes.

In my Patent No. 2,252,595, granted August 12, 1941, I have disclosed the reinforcement of insoles with a special fabric material which is stretchable lengthwise of the insole but relatively non-stretchable transversely of the insole. Such material may be used to reinforce all types of insoles which are made relatively flexible by being made thin, or which have been weakened at the forepart particularly adjacent the ball portion such as by reducing the usual thickness of the insole or by slashing the insole by cuts, slits, perforations or otherwise so that the insole will be more flexible. The reinforcement is intended to strengthen the insole, give it more stability and to otherwise render the shoes made from such insoles more durable in use while at the same time preserving and retaining the flexibility of the insole.

The present application is directed to similar improvements but specifically relates to applying rubber or similar elastic material to the insole either by coating the insole, such as by spraying, brushing or otherwise, or by cementing a thin sheet of rubber to the insole.

It is an object of my invention to apply an elastic rubber reinforcement to the under side of an insole, particularly over the area which has been weakened, to render the sole flexible in such a manner as to strengthen the insole and render it more stable while at the same time preserving and retaining the flexible character of the insole.

It is an object of my invention to apply the rubber reinforcement to all types of insoles such as insoles used in the manufacture of Compo, McKay or Goodyear welt constructions or the like.

More specifically, it is a particular object of my invention to apply a coating of rubber in the form of a liquid solution of rubber such as latex or the like to the area of an insole which has been weakened by slashes, cuts or otherwise, and preferably to apply the rubber in such a manner that it is deposited into the cuts, slashes or openings used to weaken the insole whereby the rubber coating will tend to weld together or close up the slashes or cuts and will render the insole more stable while still permitting the flexing of the insole.

Further objects and advantages of my improvements will be more readily apparent from the following description of preferred embodiments thereof taken in connection with the attached drawing in which:

Fig. 1 is a bottom view of an insole which may, if desired, be provided with the slashes to weaken the ball portion of the insole and which has a coating of latex or equivalent rubber solution applied thereto;

Fig. 2 is a bottom view of an insole which may be provided with slashes and which has applied thereto a thin sheet of rubber or similar elastic material;

Fig. 3 is a bottom view of an insole for a welt shoe to which has been applied a coating of latex;

Fig. 4 is a diagrammatic view of a preferred method of applying latex to the insole so that the latex will flow into the slashes or cuts formed in the insole;

Fig. 5 is a longitudinal section taken on the plane indicated 5—5 in Fig. 1;

Fig. 6 is a longitudinal section taken on the plane indicated 6—6 in Fig. 2; and Fig. 7 is a longitudinal section taken on the plane indicated 7—7 in Fig. 3 and showing how the latex fills the slashes or cuts.

It will be understood that it is a purpose of my invention to reinforce insoles of all types by the application of rubber, either in sheet form or by applying a coating of rubber through the use of rubber solution such as latex. Such reinforcement is applied particularly to insoles which have been weakened to be more readily flexible, as by being made thin in certain areas, by slashing of the insoles or some other method of weakening the insoles to render them flexible.

The insole 10 in Fig. 1 may be of any of the usual types and may be composed of leather, imitation leather, fibre or the like. The insole may have a weakened area 12 across the ball portion of the insole which is formed by cutting, slitting or slashing the insole as by the cuts 14 or in some other equivalent manner. It will be understood that the slashes or cuts may be made in various manners, regularly or irregularly, and that other forms of openings other than cuts or slits may be used for this purpose.

In Fig. 1 I have shown the insole 10 reinforced by a coating of rubber 16 which may be applied only over the weakened area or over the entire sole if desired. The rubber coating tends to strengthen and stabilize the sole but preserves and retains the flexibility of the sole. The rubber reinforcement will tend to prevent wrinkling, puckering or buckling of the inner surface of the insole after being built into a shoe and placed in use.

When the insole has been weakened by the slashes 14, I prefer to apply latex in such a manner that it will flow into the slashes 14 so that the slashes will tend to be closed up or welded back together. One method is to apply the latex as shown diagrammatically in Fig. 4 in which the sole 10 is bent around a mandrel 20 and the latex 16 is applied by spraying from a nozzle 22. The insole is preferably allowed to dry while still bent so that the latex will remain in the slashes. After the insole has dried it may be bent back to a flat state such as by bending the insole in a reverse direction around the mandrel thereby squeezing the slashes tight together and tending to weld or close up the slashes. The insole is free to flex in normal use since the rubber stretches allowing the flexibility.

Instead of applying the rubber in the form of a solution, I may apply a reinforcement in the form of a thin sheet of rubber which is cemented to the insole preferably over the weakened area. Fig. 2 shows a sole 10 having a weakened area 12 to which has been cemented a thin sheet of rubber 18 which extends from side to side of the insole over the weakened area. The rubber, being elastic, will tend to keep the slashes closed but will permit flexing of the insole as is desired.

A rubber coating or a thin sheet of rubber may be applied to welt insoles in the same manner as previously described, and in Fig. 3 I have shown a welt insole 24 having an upstanding rib 26 and which may or may not be provided with the slashes 28. A rubber coating 30 is shown applied over the weakened area and extending into the slashes 28. The rubber coating serves to reinforce the rib 26 as well as the reduced marginal edge 32 of the insole. When the slahses are cut clear through the rib and rubber tends to weld the rib back together and preserve its strength for holding the stitches which while still permitting flexing of the insole.

The term "rubber" as used in the appended claims is intended to include natural rubber and its equivalents such as so-called synthetic rubber which, when applied as a coating, is in the form of a liquid solution of rubber such as latex, rubber cement, a liquid dispersion of rubber or the like.

I claim:

1. The method of manufacturing a flexible insole which consists in slashing the under side of the sole at the forepart to render the insole flexible, bending the insole so as to open up the slashes and applying a coating of latex to the slashed area of the insole while the insole is bent whereby the latex flows into the slashes and subsequently flattening the sole.

2. An insole for a boot or shoe, the under side of said insole having a slashed weakened area at the ball portion and a coating of rubber applied to the under side of the insole over the slashed weakened area, said rubber coating extending into the slashes substantially to the bottom thereof whereby the rubber in said slashes welds the side walls of the slashes together but allows flexing of the insole through stretching of the rubber in the slashes.

3. An insole for a boot or shoe, the under side of said insole having a series of slashes extending transversely of the insole and rubber deposited in the slashes substantially to the bottoms thereof in sufficient amount to close up the slashes for the purpose of reinforcing the insole while permitting flexing of the insole through stretching of the rubber.

4. An insole for a boot or shoe, the underside of said insole having a series of slashes extending transversely of the insole and rubber deposited on the side walls of the slashes substantially below the surface of the insole in sufficient amount to close up the slashes for the purpose of reinforcing the insole while permitting flexing of the insole through stretching of the rubber.

CLAUDE H. DANIELS.